United States Patent
Kikuchi et al.

(10) Patent No.: US 10,252,361 B2
(45) Date of Patent: Apr. 9, 2019

(54) CUTTER FOR SKIVING (71) Applicant: MITSUBISHI HEAVY INDUSTRIES MACHINE TOOL CO., LTD., Ritto-shi, Shiga (JP)

(72) Inventors: Toshimasa Kikuchi, Tokyo (JP); Yozo Nakamura, Tokyo (JP); Naotaka Komatsu, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 210 days.

(21) Appl. No.: 15/108,853

(22) PCT Filed: Apr. 13, 2015

(86) PCT No.: PCT/JP2015/061307
§ 371 (c)(1),
(2) Date: Jun. 29, 2016

(87) PCT Pub. No.: WO2015/182264
PCT Pub. Date: Dec. 3, 2015

(65) Prior Publication Data
US 2016/0318110 A1 Nov. 3, 2016

(30) Foreign Application Priority Data
May 30, 2014 (JP) ................................ 2014-111892

(51) Int. Cl.
B23F 21/00 (2006.01)
B23F 21/10 (2006.01)
B23F 5/16 (2006.01)

(52) U.S. Cl.
CPC .............. B23F 21/10 (2013.01); B23F 5/163 (2013.01)

(58) Field of Classification Search
CPC ........ B23F 5/163; B23F 21/245; B23F 15/06; B23F 21/16; B23F 21/10
See application file for complete search history.

(56) References Cited

U.S. PATENT DOCUMENTS 1,648,470 A 11/1927 Anderson
1,772,634 A * 8/1930 Olson ..................... B23F 21/16
407/26

(Continued)

FOREIGN PATENT DOCUMENTS

CN 102264498 A 11/2011
CN 103068509 A 4/2013

(Continued)

OTHER PUBLICATIONS

Office Action dated Feb. 13, 2018, issued in corresponding Korean Application No. 2016-7017315.

(Continued)

*Primary Examiner* — Will Fridie, Jr.
(74) *Attorney, Agent, or Firm* — Birch, Stewart, Kolasch & Birch, LLP (57) ABSTRACT

This cylindrical cutter for skiving comprises a plurality of cutting edge parts in the circumferential direction by having tooth grooves be formed between circumferentially adjoining cutting edge parts with the tooth grooves being formed into a helical shape twisting in the axial direction. Cutting edge grooves are each formed in the cutting edge parts so as to divide the cutting edge parts into multiple sections in the length direction of the tooth grooves.

5 Claims, 6 Drawing Sheets

(56) References Cited

U.S. PATENT DOCUMENTS

| | | | | |
|---|---|---|---|---|
| 1,792,548 A | * | 2/1931 | Olson | B23F 21/16 407/26 |
| 1,916,259 A | * | 7/1933 | Ewert | B23F 21/16 407/23 |
| 2,916,803 A | * | 12/1959 | Wildhaber | B23F 21/16 407/26 |
| 3,371,396 A | * | 3/1968 | Johnson | B23F 21/16 407/23 |
| 3,374,518 A | * | 3/1968 | Bentjens | B23F 21/16 407/26 |
| 5,338,134 A | * | 8/1994 | Peng | B23F 21/16 407/23 |
| 2,304,586 A | | 12/1994 | Miller | |
| 8,851,962 B2 | | 10/2014 | Yanase et al. | |
| 8,979,610 B2 | | 3/2015 | Yanase et al. | |
| 2010/0210198 A1 | * | 8/2010 | Yanase | B23F 21/026 451/547 |
| 2011/0269383 A1 | * | 11/2011 | Yanase | B23F 21/026 451/547 |
| 2012/0099939 A1 | | 4/2012 | Stadtfeld | |
| 2012/0184187 A1 | | 7/2012 | Yanase et al. | |
| 2012/0252317 A1 | | 10/2012 | Yanase et al. | |
| 2012/0328383 A1 | * | 12/2012 | Stadtfeld | B23F 15/06 409/38 |
| 2013/0156513 A1 | | 6/2013 | Yoshizumi et al. | |
| 2014/0314504 A1 | * | 10/2014 | Vogel | B23F 21/245 407/29 |

FOREIGN PATENT DOCUMENTS

| | | |
|---|---|---|
| DE | 846 650 C | 9/1952 |
| DE | 1 124 786 B | 3/1962 |
| EP | 2 487 008 A1 | 8/2012 |
| FR | 529.117 A | 11/1921 |
| GB | 923087 A | 4/1963 |
| JP | 55-65029 A | 5/1980 |
| JP | 2000-218437 A | 8/2000 |
| JP | 2012-45687 A | 8/2000 |
| JP | 2011-218460 A | 11/2011 |
| JP | 2013-18117 A | 1/2013 |
| JP | 2013-500875 A | 1/2013 |
| JP | 2013-517954 A | 5/2013 |
| JP | 2014-39971 A | 3/2014 |
| JP | 2014-210335 A | 11/2014 |

OTHER PUBLICATIONS

Taiwanese Office Action for Taiwanese Application No. 104112595, dated Aug. 24, 2016, including English translation.

Extended European Search Report dated Feb. 13, 2017 for Application No. 15800559.5.

International Preliminary Report on Patentability and Written Opinion of the International Searching Authority (PCT/IB/338, PCT/IB/373 and PCT/ISA/237) dated Dec. 15, 2016 for Application No. PCT/JP2015/061307, along with an English translation and a corrected version of the PCT/ISA/237.

International Search Report (PCT/ISA/210) dated Jul. 7, 2015 for Application No. PCT/JP2015/061307, along with an English translation and corrected version.

Maiuri, "Hob Tool Life Technology Update", Geartechnology, Mar./Apr. 2009, 10 pages, XP-007919982.

MHI Group, "MHI Develops "Mitsubishi Super Skiving System" enabling High-Speed, High-precision Cutting of Internal Gears at Low Cost", Press Information, No. 1843, Oct. 20, 2014, XP55208974, pp. 1-2.

Sugimoto et al., "Performance of Skiving Hobs in Finishing Induction Hardened and Carburized Gears", Gear Technology, May/Jun. 2003, pp. 34-41, XP-007920281.

Office Action dated May 23, 2017 in corresponding Canadian Application No. 2,935,533.

Chinese Office Action dated Nov. 1, 2017 issued in corresponding Chinese Application No. 201580003478.2.

* cited by examiner

CUTTER FOR SKIVING

TECHNICAL FIELD

The present invention relates to a skiving cutter for generating a gear on a skiving machine.

BACKGROUND ART

In a case for example of generating an internal gear, it is difficult to use a general hobbing machine and thus a gear shaper is usually used. For the generation of an internal gear by use of this gear shaper, gear shaping is usually performed in which an annular workpiece is cut into a given tooth profile by: linearly moving a pinion cutter in the axial direction of the workpiece while rotating the workpiece and the pinion cutter relative to each other; performing gear cutting on an area of the inner peripheral surface of the workpiece in the circumferential direction along the axial direction of the workpiece; and repeating this step for all the areas of the inner peripheral surface of the workpiece in the circumferential direction.

Here, internal gear machining with a hobbing machine is possible by using a special hobbing machine for internal gear cutting and a dedicated hobbing cutter. In a hobbing machine, a tool arbor is oriented substantially perpendicularly to the axial direction of the workpiece. For this reason, if a small-diameter internal gear is to be generated, the shaft of the tool and the workpiece will interfere with each other, which limits the dimensions of machinable workpieces. Thus, internal gear machining with a bobbing machine is limited to machining of relatively-large internal gears. In contrast, in skiving, the axis-crossing angle between the axis of the tool and the axis of the workpiece is about 30° or less. With such a positional relationship, the shaft of the tool and the workpiece are unlikely to interfere with each other. Thus, an internal gear can be machined regardless of whether the diameter of the workpiece is large or small.

Meanwhile, in gear shaping as mentioned above, in order to machine all the areas of a workpiece in the circumferential direction, a pinion cutter is moved back and forth (machining stroke and return stroke) in the axial direction of the workpiece a plurality of times corresponding to the circumferential length of the workpiece. Hence, an action that does not directly contribute to the gear cutting (return stroke) must be performed, which lowers the machining efficiency. In view of this, in recent years, skiving has drawn attention which requires no backward moving action of a pinion cutter or the like (return stroke) and involves cutting all the areas of the inner peripheral surface of an annular workpiece into a given axial tooth profile in one forward moving action of the pinion cutter or the like (machining stroke) in the axial direction of the workpiece with the workpiece and the pinion cutter rotated relative to each other.

CITATION LIST

Patent Literature

Patent Literature 1: Japanese Patent Application Publication No. 2014-039971

SUMMARY OF INVENTION

Technical Problem

In skiving as mentioned above, the cutter continuously cuts all the areas of the workpiece in the circumferential direction. Thus, load on the cutting edges of the cutter is larger than the gear shaping, in which cutting is performed intermittently. For this reason, the life of the cutting edges of the cutter is shorter.

In view of this, an object of the present invention is to provide a skiving cutter capable of extending the life of its cutting edges.

Solution to Problem

A skiving cutter according to the present invention for solving the above-mentioned problem is a skiving cutter, characterized in that the skiving cutter has a cylindrical shape and comprises a plurality of cutting edge parts arranged in a circumferential direction such that a tooth groove is formed between circumferentially-adjoining ones of the cutting edge parts, the tooth groove having a helical shape twisting along an axial direction, and a cutting edge groove is formed in each of the cutting edge parts such that the cutting edge part is divided into a plurality of sections in a longitudinal direction of the tooth groove.

Also, a skiving cutter according to the present invention is the above skiving cutter, characterized in that an outer periphery thereof has such a barrel shape that an outer diameter of an axial center section is larger than outer diameters of opposite axial end sides.

Also, a skiving cutter according to the present invention is any of the above skiving cutters, characterized in that the outer periphery thereof has such a tapered shape that an outer diameter of one axial end side which is a cutting edge side of the cutting edge parts is smaller than an outer diameter of an opposite axial end side.

Also, a skiving cutter according to the present invention is any of the above skiving cutters, characterized in that a rake angle $\theta 1$ of each of the cutting edge parts is greater than or equal to 0° but less than or equal to 20°.

Also, a skiving cutter according to the present invention is any of the above skiving cutters, characterized in that a peripheral relief angle $\theta 2$ of each of the cutting edge parts is greater than 0° but less than or equal to 12°.

Also, a skiving cutter according to the present invention is any of the above skiving cutters, characterized in that a side relief angle $\theta 3$ of each of the cutting edge parts is greater than 0° but less than or equal to 5°.

Also, a skiving cutter according to the present invention is any of the above skiving cutters, characterized in that an angle $\theta 4$ between a cutting face and a tooth trace L1 of each of the cutting edge parts is greater than or equal to 85° but less than or equal to 95°.

Advantageous Effect of Invention

In these skiving cutters according to the present invention, each cutting edge part is divided into a plurality of sections in the longitudinal direction of the tooth groove. Thus, these cutting edge parts can spread load on the cutting edges, and the life of the cutting edge can be extended accordingly.

DESCRIPTION OF EMBODIMENTS

Embodiments of a skiving cutter according to the present invention will be described with reference to the drawings. However, the present invention is not limited only to the embodiments to be described with reference to the drawings.

Main Embodiment

A main embodiment of a skiving machine utilizing the skiving cutter according to the present invention will be described with reference to FIGS. 1 to 4.

Figure 1:
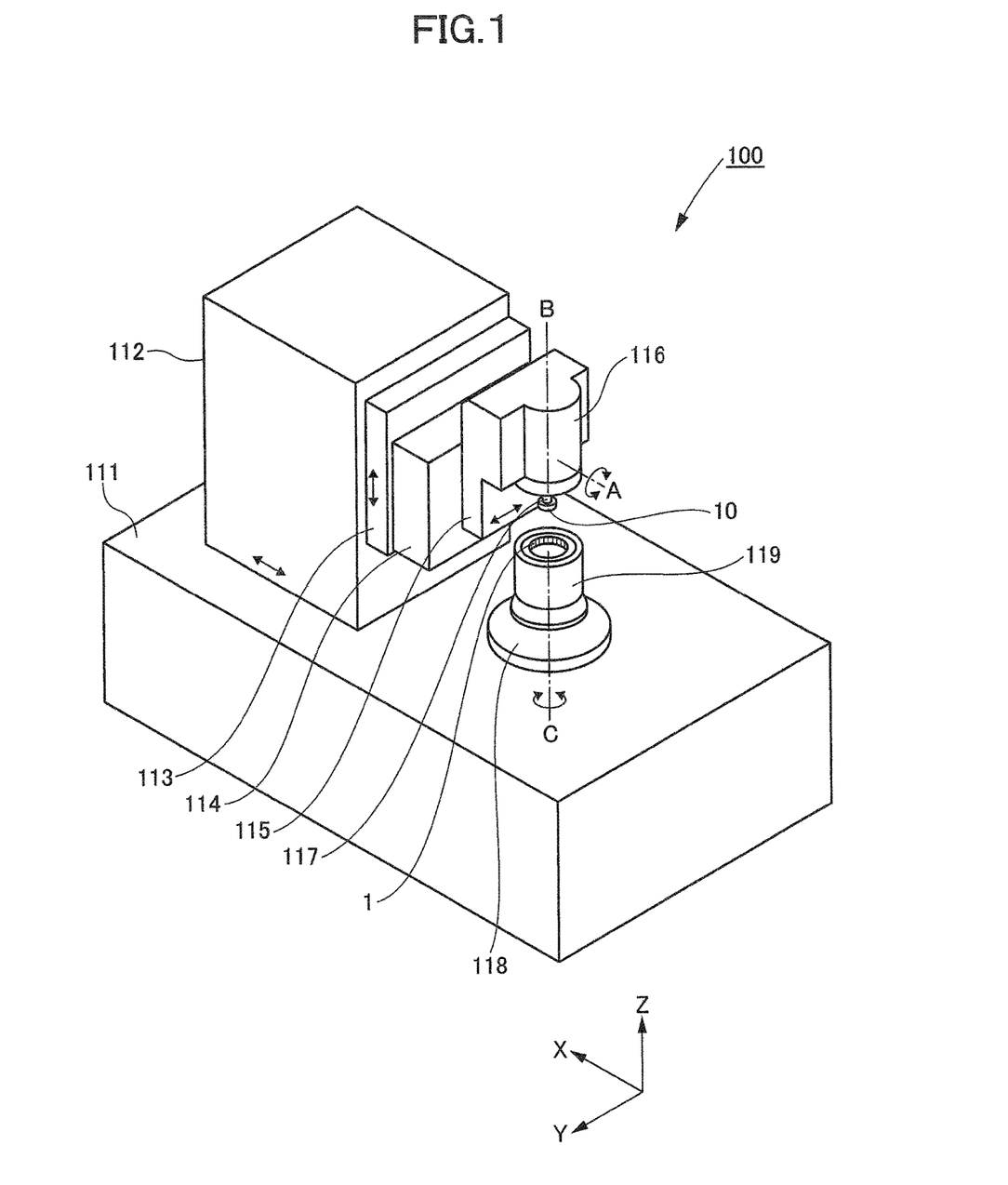
FIG. 1 is a schematic structure view of a main embodiment of a skiving machine utilizing a skiving cutter according to the present invention.

As shown in FIG. 1, a column 112 is supported on a bed 111 so as to be capable of being moved in a horizontal X-axis direction. A saddle 113 is supported on the column 112 so as to be capable of being raised and lowered in a vertical Z-axis direction. A turn head 114 is supported on the saddle 113 so as to be capable of being turned about a horizontal tool turn axis A. A slide head 115 is supported on the turn head 114 so as to be capable of being moved in a horizontal Y-axis direction. A tool head 116 is provided on the slide head 115.

A tool arbor 117 is supported on the tool head 116 so as to be capable of being rotated about a tool rotation axis B. A cylindrical skiving cutter 10 is detachably mounted to the lower end of the tool arbor 117. This skiving cutter 10 is capable of being turned about the tool turn axis A, moved in the Y-axis direction, and rotated about the tool rotation axis B by actuation of the heads 114 to 116, respectively.

On the other hand, a rotation table 118 is provided at a position on the bed 111 in front of the column 112 so as to be capable of being rotated about a vertical workpiece rotation axis C. A cylindrical attachment jig 119 is attached to the upper surface of the rotation table 118. A workpiece 1 which is an internal gear to be machined is detachably attached to the inner peripheral surface of the upper end of the attachment jig 119. This workpiece 1 can be rotated about the workpiece rotation axis C by actuation of the rotation table 118.

Figure 2A:
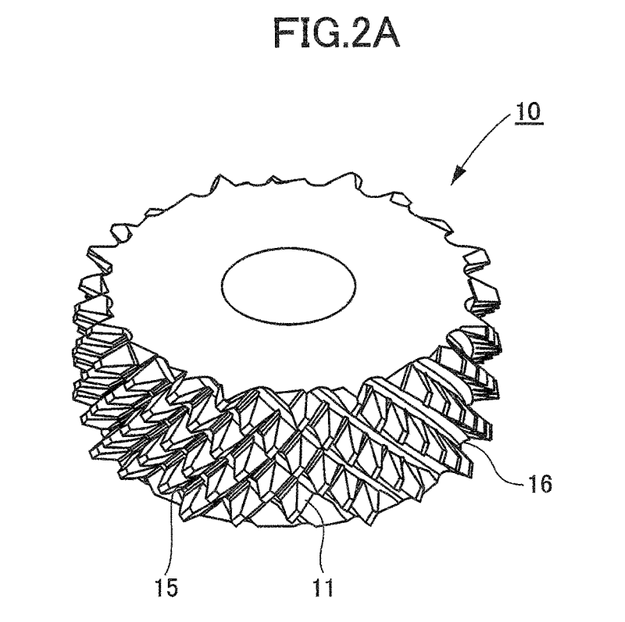
FIG. 2A is an enlarged view of the skiving cutter taken out of FIG. 1.
Figure 2B:
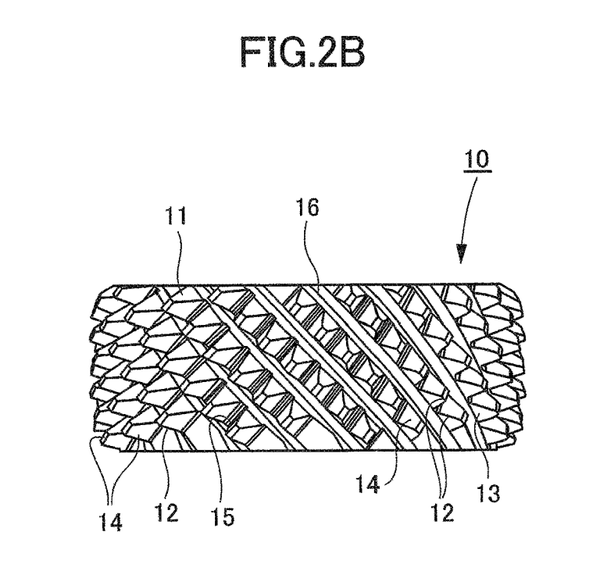
FIG. 2B is a side view of the skiving cutter in FIG. 2A.

FIGS. 2A and 2B schematically show the structure of the skiving cutter 10. In FIGS. 2A and 2B, reference sign 11 denotes a cutting edge part, reference sign 12 denotes a cutting edge, reference sign 13 denotes a cutting face, and reference sign 14 denotes a flank.

A plurality of cutting edge parts 11 are formed in the circumferential direction with a plurality of tooth grooves 15 each provided between circumferentially-adjoining ones of the cutting edge parts 11. These tooth grooves 15 have a helical shape twisting along the axial direction. Also, cutting edge grooves 16 are formed so as to divide each cutting edge part 11 into a plurality of sections in the longitudinal direction of the tooth grooves 15. Thus, a plurality of cutting edge parts 11 are provided also in the axial direction. Also, the cutting edge 12 and the cutting face 13 are formed on one side in the axial direction (the left lower side in FIG. 2B, the right side in FIG. 3B, and the near side of the sheet of FIG. 3C) of each cutting edge part 11.

Figure 3A:
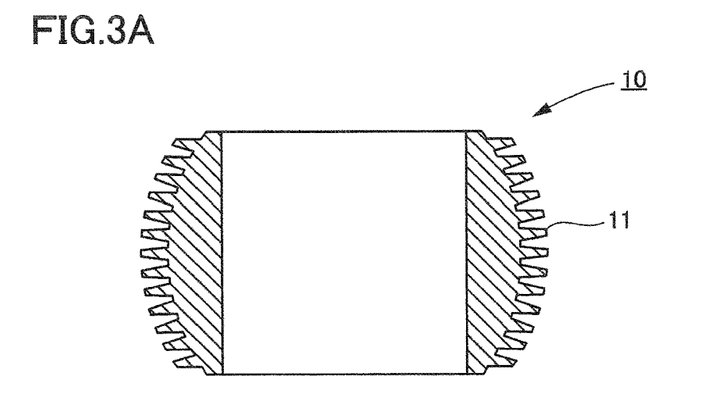
FIG. 3A is a cross-sectional view of the skiving cutter in FIG. 2B with its characteristic feature exaggerated.

Further, as shown in FIG. 3A, the skiving cutter 10 has a barrel shape with its outer peripheral surface defining an arched shape in the axial direction such that the outer diameter of an axial center section is larger than the outer diameters of opposite axial end sides. Note that the illustration in FIG. 3A is exaggerated to facilitate the understanding of the barrel shape.

Figure 3B:
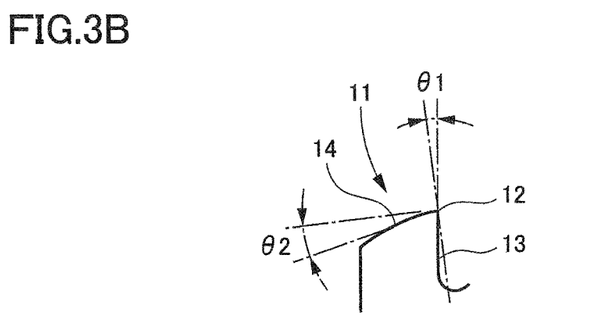
FIG. 3B is an enlarged side view of a cutting edge part of the skiving cutter taken out of FIG. 1.

Also, as shown in FIG. 3B, a rake angle (the angle between the cutting face 13 and a plane perpendicular to the cutting direction (the direction of a tangent to the cutter rotation)) θ1 of each cutting edge part 11 is preferably greater than or equal to 0° but less than or equal to 20° (particularly preferably 0°) for the following reason. If the rake angle θ1 is less than 0°, the cutting load will be so large that the surface texture of the machine surface may be poor and the amount of wear may be large. On the other hand, if the rake angle θ1 is greater than 20°, the strength of the tip of the edge will be so low that chipping and the like may occur.

Also, a peripheral relief angle (the angle between the peripheral flank 14 and the cutting direction at the tip of the cutting edge 12 (the direction of the tangent to the cutter rotation)) θ2 of each cutting edge part 11 is preferably greater than 0° but less than or equal to 12° (particularly preferably greater than or equal to 5° but less than or equal to 12°) for the following reason. If the peripheral relief angle θ2 is less than or equal to 0°, the outer peripheral surface of the cutter will interfere with the bottom lands of the internal gear, so that the surface texture of the bottom lands of the internal gear may be poor and the amount of wear of the flanks at the outer periphery of the cutter may be large. In contrast, if the peripheral relief angle θ2 is 5° or greater, the interference of the outer peripheral surface of the cutter due to springback of the cutting edge part after its elastic deformation during cutting can be reliably avoided. However, if the peripheral relief angle θ2 is greater than 12°, it will be difficult to manufacture the cutter with a large effective face width and therefore difficult to extend the life of the cutter.

Figure 3C:
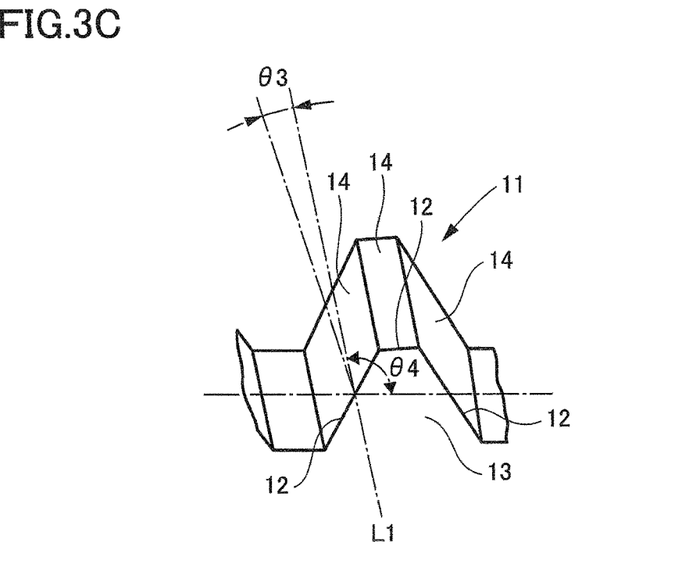
FIG. 3C is an enlarged perspective view of the cutting edge part of the skiving cutter taken out of FIG. 1.
Figure 4A:
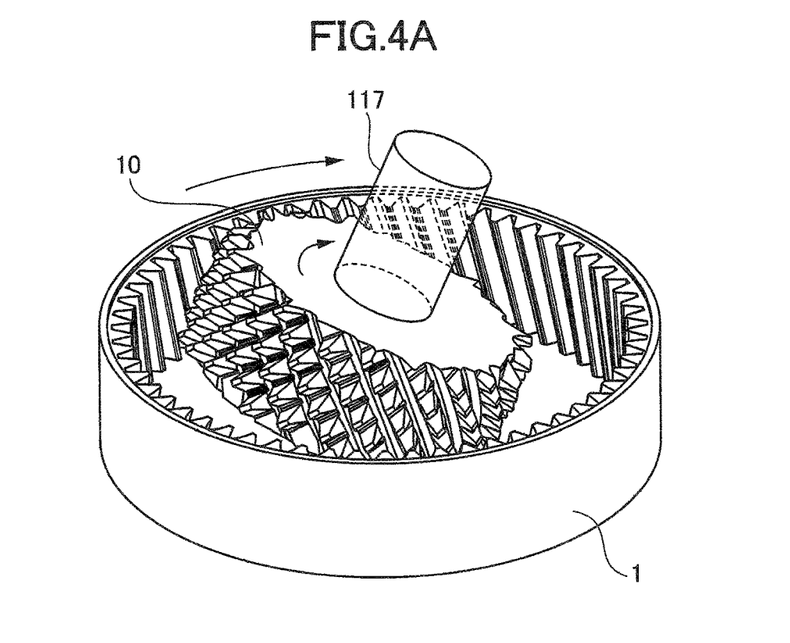
FIG. 4A is an explanatory view of skiving with the skiving cutter in FIG. 1.
Figure 4B:
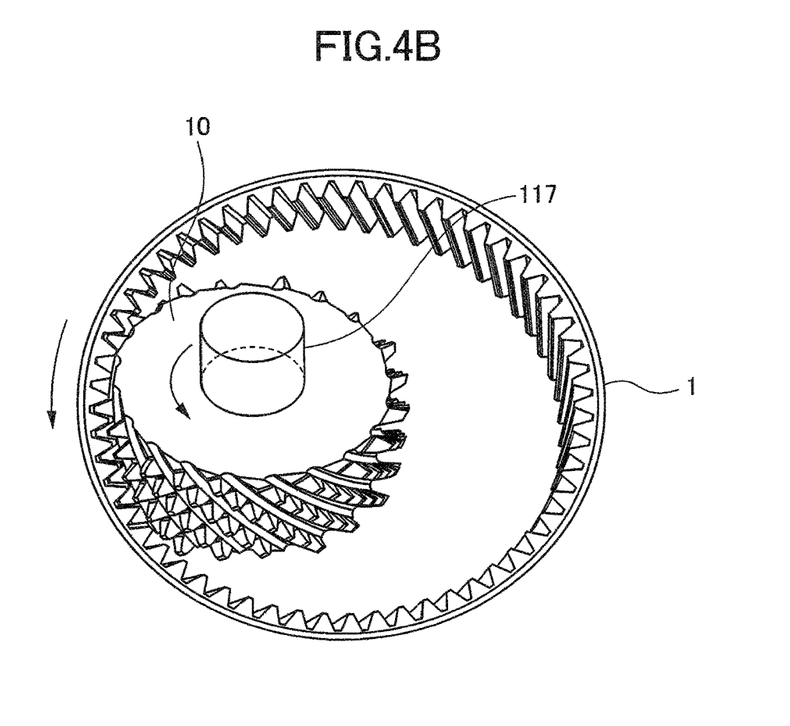
FIG. 4B is a view of FIG. 4A as seen from below.

Further, as shown in FIG. 3C, a side relief angle (the angle between the flank 14 on a side on the pitch circuit of the cutter and the cutting direction (the direction of the tangent to the cutter rotation)) θ3 of each cutting edge part 11 is preferably greater than 0° but less than or equal to 5° (particularly preferably greater than or equal to 2° but less than or equal to 5°) for the following reason. If the side relief angle θ3 is less than or equal to 0°, the cutting load will be so large that the surface texture of the machine surface may be poor and the amount of wear may be large. On the other hand, if the side relief angle θ3 is greater than 20°, the strength of the tip of the edge will be so low that chipping and the like may occur.

Also, an angle θ4 between the cutting face 13 and a tooth trace L1 of each cutting edge part 11 (the angle between the cutting edge groove 16 and the tooth groove 15) is preferably greater than or equal to 85° but less than or equal to 95° (in the range of 90°±5° inclusive) for the following reason. If the angle θ4 is an inclination within the range of ±5° from 90°, the direction of flow of chips generated during cutting can be changed, which makes it possible to greatly reduce the occurrence of biting of chips. In contrast, if the angle θ4 is an inclination outside the range of ±5° from 90°, the difference in sharpness between the left and right sides of the cutting edge 12 in FIG. 3C will be so large that the surface texture of the machine surface to be cut by the blunt-angle side of the cutting edge 12 may possibly be poor.

In a skiving machine 100 with the above skiving cutter 10 according to this embodiment mounted to the tool arbor 117, a workpiece 1 is mounted to the attachment jig 119, and the column 112, the saddle 113, the turn head 114, and the slide head 115 are driven such that the skiving cutter 10 is moved in the X-, Y-, and Z-axis directions to be placed inside the workpiece 1 and also turned about the tool turn axis A to an axial angle Σ corresponding to the helix angle of the workpiece 1.

Then, the column 112 is driven to move the skiving cutter 10 in the X-axis direction (toward the left side in FIG. 1), the tool head 116 is driven to rotate the skiving cutter 10 about the tool rotation axis B, and the rotation table 118 is driven to rotate the workpiece 1 about the workpiece rotation axis C.

Further, the column 112 and the saddle 113 are driven to move the skiving cutter 10 in the X-axis direction by an amount corresponding to a target cutting amount and then move the skiving cutter 10 in the Z-axis direction. As a result, the skiving cutter 10 cuts the inner peripheral surface of the workpiece in the circumferential direction and the axial direction into a tooth profile, so that the entire inner peripheral surface of the workpiece 1 is skived into the tooth profile (see FIGS. 4A and 4B).

The cutting edge grooves 16 are formed so as to divide each cutting edge part 11 of the skiving cutter 10 into a plurality of sections in the longitudinal direction of the tooth grooves 15. Thus, a plurality of cutting edge parts 11 are formed in the axial direction, i.e. a plurality of cutting edges 12 are provided in the axial direction. Hence, in the above process, load on each single cutting edge 12 can be spread and reduced.

Therefore, with the skiving cutter 10 according to this embodiment, the life of the cutting edges 12 can be longer than conventional pinion cutters even though the cutting edges 12 continuously cut the entire workpiece 1 in the circumferential direction.

Also, the skiving cutter 10 has a barrel shape with its outer peripheral surface defining an arched shape in the axial direction such that the outer diameter of the axial center section is larger than the outer diameters of the opposite axial end sides. In this way, the axis-crossing angle with respect to the workpiece 1 can be large, and the slide speed of the cutter 10 relative to the workpiece 1 can be high accordingly. Hence, the machining performance can be improved.

Also, each cutting edge part 12 has the peripheral relief angle θ2, i.e. backing (peripheral flank) is formed on the cutting edge part 12. In this way, the cutting edge part 12 can be prevented from interfering with the workpiece 1 during machining.

Another Embodiment

Figure 5A:
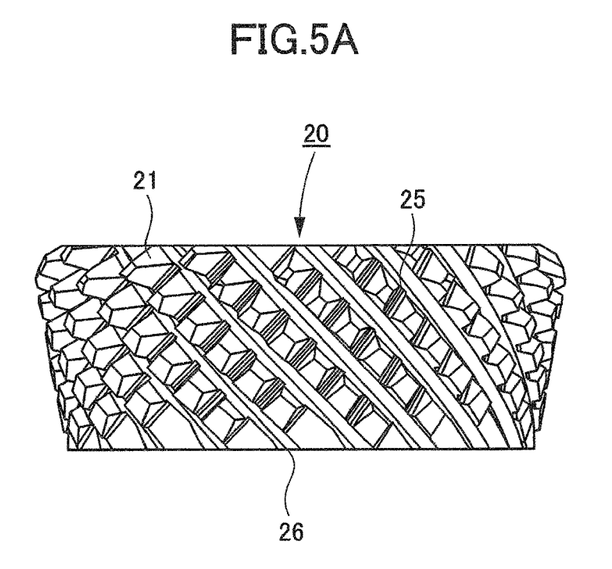
FIG. 5A is a side view showing a schematic structure of another embodiment of the skiving cutter according to the present invention.
Figure 5B:
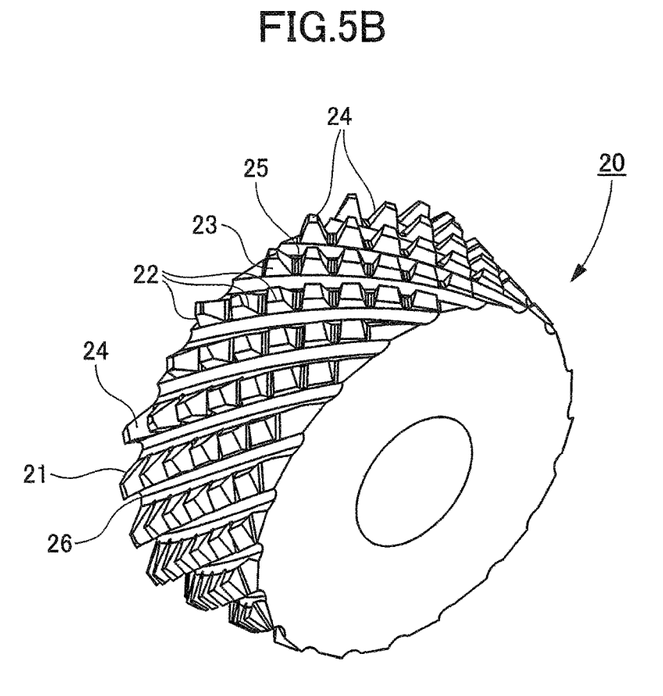
FIG. 5B is a perspective view of the skiving cutter in FIG. 5A.
Figure 6A:
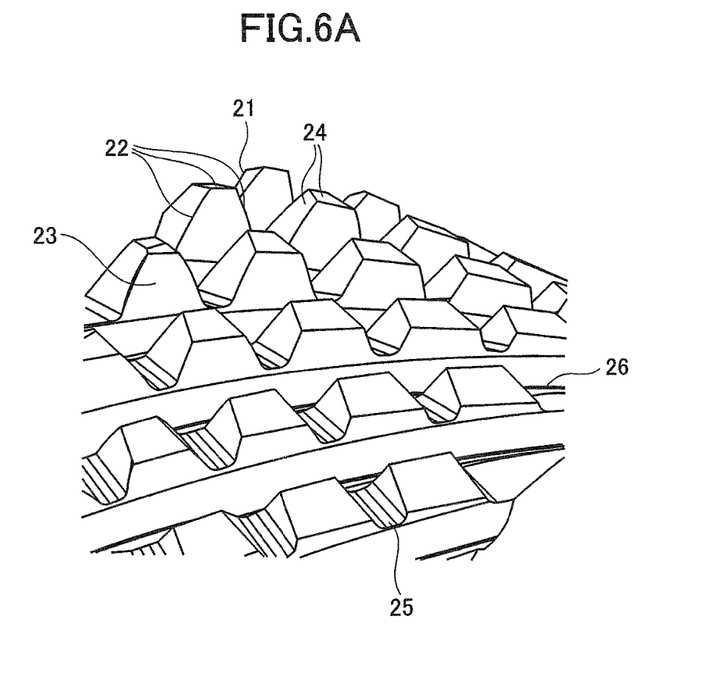
FIG. 6A is an enlarged view of cutting edge parts of the skiving cutter in FIG. 5B.
Figure 6B:
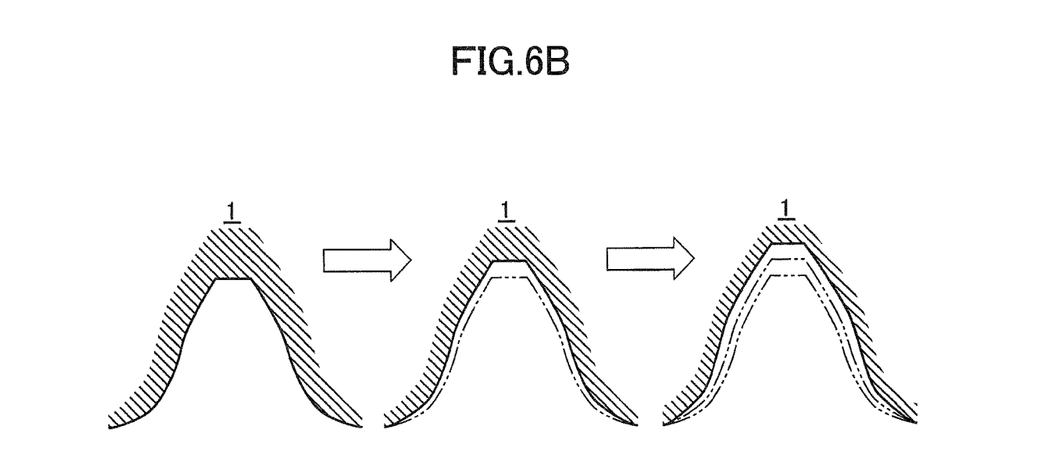
FIG. 6B is an explanatory view of the operation of the skiving cutter in FIGS. 5A and 5B.

Meanwhile, as another embodiment, for example, as shown in FIGS. 5A and 5B, a skiving cutter 20 may be employed by changing the outer periphery of the above barrel shape into such a tapered shape that the outer diameter of one axial end side which is a cutting edge 22 side of each cutting edge part 21 (the lower side in FIG. 5A and the right lower side in FIG. 5B) is smaller than the outer diameter of the opposite axial end side (the upper side in FIG. 5A and the left upper side in FIG. 5B), that is, the outer diameter decreases toward the tip side in the cutting direction from the base end side in the cutting direction. In this way, as shown in FIG. 6A, the tooth depth and the tooth thickness of the cutting edge part 21 can be larger on the base end side in the cutting direction than on the tip side in the cutting direction. Thus, as shown in FIG. 6B, the amount of cutting of a workpiece 1 can be divided into smaller amounts for different cutting edge parts 21. Hence, load on each single cutting edge 22 can be further spread and reduced. Therefore, this embodiment is very preferable.

Industrial Applicability

In the skiving cutter according to the present invention, the cutting edge parts can spread load on the cutting edges, and the life of the cutting edges can be extended accordingly. Hence, the skiving cutter according to the present invention can be utilized significantly beneficially in the industry of cutting such as gear machining.

REFERENCE SIGNS LIST 1 workpiece
10, 20 skiving cutter
11, 21 cutting edge part
12, 22 cutting edge
13, 23 cutting face
14, 24 flank
15 tooth groove
16 cutting edge groove
100 skiving machine
111 bed
112 column
113 saddle
114 turn head
115 slide head
116 tool head
117 tool arbor
118 rotation table

The invention claimed is:

1. A skiving cutter having a cylindrical shape and comprising a plurality of cutting edge parts arranged in a circumferential direction such that a tooth groove is formed between circumferentially-adjoining ones of the cutting edge parts, the tooth groove having a helical shape twisting along an axial direction of the cylindrical shape, wherein
a cutting edge groove is formed in each of the cutting edge parts such that the cutting edge part is divided into a plurality of sections in a longitudinal direction of the tooth groove and a plurality of the cutting edge parts are provided in the axial direction of the cylindrical shape with a cutting edge and a cutting face formed on each of the cutting edge parts on one side thereof in the axial direction of the cylindrical shape, and
an outer periphery of the skiving cutter has such a barrel shape that an outer diameter of an axial center section is larger than outer diameters of opposite axial end sides.

2. The skiving cutter according to claim 1, wherein the outer periphery thereof has such a tapered shape that an outer diameter of one axial end side which is a cutting edge side of the cutting edge parts is smaller than an outer diameter of an opposite axial end side.

3. The skiving cutter according to claim 1, wherein a peripheral relief angle $\theta 2$ of each of the cutting edge parts is greater than or equal to 5° but less than or equal to 12°.

4. The skiving cutter according to claim 1, wherein a side relief angle $\theta 3$ of each of the cutting edge parts is greater than or equal to 2° but less than or equal to 5°.

5. The skiving cutter according to claim 1, wherein an angle $\theta 4$ between the cutting face and a tooth trace L1 of each of the cutting edge parts is greater than or equal to 85° but less than or equal to 95°.

* * * * *